H. F. CHARLTON.
TOY.
APPLICATION FILED APR. 4, 1918.

1,285,938.

Patented Nov. 26, 1918.

INVENTOR
Henry F. Charlton,
BY Richard Bowen
ATTORNEY

WITNESSES
R. W. Hoagland
H. P. Hollingsworth

UNITED STATES PATENT OFFICE.

HENRY F. CHARLTON, OF CLEVELAND, OHIO.

TOY.

1,285,938.  Specification of Letters Patent.  Patented Nov. 26, 1918.

Application filed April 4, 1918. Serial No. 226,697.

*To all whom it may concern:*

Be it known that I, HENRY F. CHARLTON, a citizen of the United States, residing at Cleveland, in the county of Cuyahoga and State of Ohio, have invented certain new and useful Improvements in Toys, of which the following is a specification.

This invention relates to an improvement in toys and particularly to a wheeled figure toy for the amusement of children and has for its primary object to provide a casing made to resemble the figure of some familiar animal, the hind legs of which are mounted on a pivot projecting downward from the feet and the fore legs supported by a wheel rotated by a spring motor within the body of the animal, which motor when the spring is wound will cause the animal to travel in a circle about its pivotally supported hind legs.

A further object of the invention is to provide a movable figure with a tail of some light or fluffy material that will be readily blown about by currents of air generated as the figure rotates and cause the tail to swing toward the animal's head, which may be turned rearwardly, and give the figure the appearance of chasing its tail.

With the above as the principal objects in view, the invention consists in the novel construction, combination and arrangements of parts, hereinafter described, pointed out in the appended claims and illustrated in the accompanying drawings, in which, Figure 1 is a perspective view of the toy in position for use.

Fig. 2 is a front elevation of the driving mechanism separated from the body of figure of the animal to which it is applied.

Fig. 3 is an elevation of the driving mechanism seen from the left of Fig. 2, and, Fig. 4 is a detail view of the pivotal support for the hind legs on the toy animal.

In the drawings, 10 indicates the figure of some familiar animal, in the present instance a cat, within the body of which is secured a spring motor 11 mounted within a suitable frame 12 and comprising a helical spring 13 adapted to be wound upon a shaft 14 by means of a key 15 that may be inserted within an opening 16 in the side of the animal as shown in Fig. 1. The spring 13 drives through suitable and well known gearing 17 a shaft 18 on one end of which is attached a crank 19 that rotates when the spring is wound up. The spring motor and the crank are hidden within the body of the animal figure and the rotation of the shaft 18 drives a wheel or roller 28 for imparting motion to the figure. The wheel 28 is fixed on a short shaft 20 journaled at its ends in the fore feet of the animal and between said feet, the shaft having a crank 21 formed thereon. From the crank 19 on the shaft 18 within the animal a connecting rod 22 extends downwardly through an opening in the underside of the animal's body and is pivotally connected to the crank 21 in such manner that the shaft 20 and wheel 28 will continue rotation until the spring 13 of the motor runs down.

Between the hind feet of the animal figure 10 is a horizontal pin 23 attached to said feet and to which is fastened a depending pin 24 rotatably mounted in a socket 25 having a threaded projection 26 on its under side which is adapted to be screwed in the floor, a board, or other suitable place when the animal is to be put into operation.

The animal figure 10 is provided with a tail 27 made of cloth or some light fluffy material that is readily blown about by a slight current of air so that when the figure is in motion, the tail will be blown to one side of the animal's body as shown in the drawing.

In using the toy, the socket 25 is secured to the floor or some other suitable support by the screw stem 26 and the spring motor wound by the key 15. Then upon releasing the animal, the reaction of the spring 13 drives the motor and causes the wheel 28 to rotate, carrying the animal in a circle about the pin 24, the motion creating a sufficient current of air to cause the tail 27 of the animal to swing toward its head and as the latter may be turned in a rearward direction as shown, the figure will have the appearance of chasing its tail.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:

1. A toy comprising an animal figure, a spring motor within said figure, a vertical pivot swiveled to two of the legs of said figure adapted to be fixed to the floor and around which said figure may revolve, a wheeled support for the other legs, and a driving connection between said spring motor and the wheeled support.

2. A toy comprising an animal figure, a spring motor within said figure, and accessible for winding through an opening in the side of the figure, a depending pin connected to the hind legs of the animal, a socket rotatably connected to said pin and having a threaded stem, a wheeled support for the fore legs of the figure, and a driving connection between the spring motor and said wheeled support.

3. A toy comprising an animal figure having a tail capable of being blown about by light currents of air, a spring motor within the figure, a horizontal pin extending between the hind feet of the figure from which a vertical pin depends, a socket adapted to rotatably support said vertical pin, a threaded stem on said socket, a wheeled support between the fore feet of the figure, and a driving connection between the spring motor and said wheeled support.

4. A toy comprising an animal figure having a tail made of light material capable of being moved by light air currents, a spring motor within the body of the animal, a pivotal support for the hind legs of the figure, a horizontal shaft between the fore feet of the figure provided with a wheel and with a crank, a driving crank actuated by the spring motor, and a connecting rod between said driving crank and the crank of the wheeled shaft for rotating the latter and the wheel to cause the animal to travel in a circle about the pivotal support for its hind legs.

In testimony whereof I affix my signature in presence of two witnesses.

HENRY F. CHARLTON.

Witnesses:
JOHN FLACK,
R. W. LUEK.

Copies of this patent may be obtained for five cents each, by addressing the "Commissioner of Patents, Washington, D. C."